(12) United States Patent
Lin et al.

(10) Patent No.: US 6,574,034 B1
(45) Date of Patent: Jun. 3, 2003

(54) ELECTROPHORETIC DISPLAYS, DISPLAY FLUIDS FOR USE THEREIN, AND METHODS OF DISPLAYING IMAGES

(75) Inventors: Pinyen Lin, Rochester, NY (US); David H. Pan, Rochester, NY (US); Chieh-Min Cheng, Rochester, NY (US); Adam Bush, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/683,534

(22) Filed: Jan. 16, 2002

(51) Int. Cl.⁷ .............................................. G02B 26/00
(52) U.S. Cl. .................... 359/296; 345/107; 430/32; 430/38; 430/39
(58) Field of Search ...................... 430/32, 38, 39; 345/107; 359/296

(56) References Cited

U.S. PATENT DOCUMENTS

| | | | |
|---|---|---|---|
| 3,668,106 A | 6/1972 | Ota | 358/305 |
| 4,272,596 A | 6/1981 | Harbour et al. | 430/37 |
| 4,298,672 A | 11/1981 | Lu | 430/106.2 |
| 4,338,390 A | 7/1982 | Lu | 430/108.2 |
| 4,560,635 A | 12/1985 | Hoffend et al. | 430/108.2 |
| 4,741,604 A * | 5/1988 | Kornfeld | 359/296 |
| 4,760,009 A | 7/1988 | Larson | 430/137.19 |
| 4,783,389 A | 11/1988 | Trout et al. | 430/137.19 |
| 4,880,715 A * | 11/1989 | Tam et al. | 430/41 |
| 4,923,778 A | 5/1990 | Blair et al. | 430/137.19 |
| 5,017,451 A | 5/1991 | Larson et al. | 430/137.19 |
| 5,278,020 A | 1/1994 | Grushkin et al. | 430/109.3 |
| 5,290,654 A | 3/1994 | Sacripante et al. | 430/137.14 |
| 5,308,734 A | 5/1994 | Sacripante et al. | 523/335 |
| 5,344,738 A | 9/1994 | Kmiecik-Lawrynowicz et al. | 430/137.14 |
| 5,346,797 A | 9/1994 | Kmiecik-Lawrynowicz et al. | 430/137.14 |
| 5,348,832 A | 9/1994 | Sacripante et al. | 430/109.4 |
| 5,364,729 A | 11/1994 | Kmiecik-Lawrynowicz et al. | 523/322 |
| 5,366,841 A | 11/1994 | Patel et al. | 523/322 |
| 5,370,963 A | 12/1994 | Patel et al. | 430/108.4 |
| 5,403,693 A | 4/1995 | Patel et al. | 430/137.14 |
| 5,405,728 A | 4/1995 | Hopper et al. | 430/108.1 |
| 5,418,108 A | 5/1995 | Kmiecik-Lawrynowicz et al. | 430/108.1 |
| 5,496,676 A | 3/1996 | Croucher et al. | 430/137.14 |
| 5,501,935 A | 3/1996 | Patel et al. | 430/137.14 |
| 5,527,658 A | 6/1996 | Hopper et al. | 523/335 |
| 5,585,215 A | 12/1996 | Ong et al. | 430/108.2 |

(List continued on next page.)

OTHER PUBLICATIONS

U.S. patent application No. 09/683,535, Now U.S. Pat. 6,529,313 on Mar. 4, 2003.
U.S. patent application No. 09/683,547 (Still pending).
U.S. patent application No. 10/046,194 (Still pending).
U.S. patent application No. 10/046,510 Now U.S. Pat. 6,525,866 on Feb. 25, 2003.

Primary Examiner—Evelyn Lester
(74) Attorney, Agent, or Firm—Oliff & Berridge, PLC; Eugene O. Palazzo

(57) ABSTRACT

A method for displaying an image with an electrophoretic display device that includes a multiplicity of individual reservoirs, each containing an electrophoretic display fluid, located between two conductive film substrates, at least one of which is transparent, includes appropriately applying an electric field and a magnetic force to a selected individual reservoir in a manner to cause either a first set of particles or a second set of particles of the display fluid to be displayed. The first set of particles exhibit a color different from and contrasting to a color of the second set of particles, and also preferably a different charging property.

12 Claims, 5 Drawing Sheets

U.S. PATENT DOCUMENTS

| | | | |
|---|---|---|---|
| 5,650,255 A | 7/1997 | Ng et al. | 430/137.14 |
| 5,650,256 A | 7/1997 | Veregin et al. | 430/137.15 |
| 5,866,292 A | 2/1999 | Chamberlain et al. | 430/115 |
| 5,872,552 A | 2/1999 | Gordon, II et al. | 345/107 |
| 6,017,584 A | 1/2000 | Albert et al. | 427/213.3 |
| 6,113,810 A | 9/2000 | Hou et al. | 252/572 |
| 6,203,961 B1 | 3/2001 | Pan et al. | 430/114 |
| 6,392,786 B1 * | 5/2002 | Albert | 359/296 |
| 6,525,866 B1 * | 2/2003 | Lin et al. | 359/296 |
| 6,529,313 * | 3/2003 | Lin et al. | 359/296 |

* cited by examiner

ELECTROPHORETIC DISPLAYS, DISPLAY FLUIDS FOR USE THEREIN, AND METHODS OF DISPLAYING IMAGES

CROSS REFERENCE TO RELATED APPLICATIONS

This Application is related to the following U.S. patent applications Ser. No. 09/683,535, now U.S. Pat. No. 6,529,313 issued on Mar. 4, 2003; Ser. No. 09/683,547, still pending to date; Ser. No. 10/046,194, still pending to date; and Ser. No. 10/046,510, now U.S. Pat. No. 6,525,866 issued on Feb. 25, 2003, wherein each were filed on even date herewith and are incorporated herein by reference in their entireties.

BACKGROUND OF THE INVENTION

1. Field of the Invention

The invention relates to novel fluid compositions for use in an electrophoretic display device, electrophoretic display devices containing such display fluids, and methods of displaying images with the electrophoretic display devices.

2. Description of Related Art

Electrophoretic displays, also more commonly referred to as electronic paper, are well known in the art. An electrophoretic display generally comprises a suspension of a single type of charged pigment particles colloidally dispersed in a colored liquid of matching specific gravity contained in a cell comprising two parallel and transparent conducting electrode panels. The charged particles are transported between the electrode panels under the influence of an electric field, and can therefore be made to display an image through appropriate application of the electric field on the electrodes. The advantages of electrophoretic displays as a means for providing information and displaying images has been well appreciated in the prior art.

U.S. Pat. No. 4,272,596, incorporated herein by reference in its entirety, illustrates a typical electrophoretic display structure. The electrophoretic display device comprises a pair of electrodes associated so as to form a cavity therebetween, which cavity is filled with an electrophoretic suspension layer comprising a colored suspending medium containing colloidal sized particles in an electrically insulating liquid and finely divided electrophoretic particles suspended in the suspending medium. A source of electrical potential is coupled to the electrodes and with an electric field applied, the marking particles form an image as they follow the field. See especially FIG. 1 therein.

U.S. Pat. No. 6,113,810 describes a dielectric dispersion for use in an electrophoretic display that includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second pluralities. In one embodiment, the first and second plurality of particles are each formed by separate two stage dispersion polymerization reactions. Each set of particles is formed with unique secondary and functional monomers. Corresponding charge control agents are added to the dispersion to establish opposite polarities on the respective particles.

U.S. Pat. No. 6,017,584 discloses encapsulated displays, i.e., displays in which the electrophoretic fluid is encapsulated within a microcapsule. This fluid may be a mixture of two or more fluids or may be a single fluid. The displays may further comprise particles dispersed in a suspending fluid, wherein the particles contain a liquid. In either case, the suspending fluid may have a density or refractive index substantially matched to that of the particles dispersed therein. Application of electric fields to any of the electrophoretic displays described therein is indicated to affect an optical property of the display.

While improvements have been made in the field of electrophoretic displays, many problems still need to be addressed in order for electronic paper applications to move toward large commercial scale production and use. For example, quality and resolution of the display devices can continue to be further improved.

SUMMARY OF THE INVENTION

It is thus an object of the present invention to develop novel electrophoretic display fluids that are improved in operation and exhibit improved image quality and resolution when used in an electrophoretic display device.

It is a still further object of the present invention to develop improved methods of operating an electrophoretic display device to obtain higher quality and higher resolution images.

These and other objects are achieved by the present invention, which in embodiments is directed to a method of displaying an image with an electrophoretic display device, the electrophoretic display device comprising a multiplicity of individual reservoirs, each containing an electrophoretic display fluid, located between two conductive film substrates, at least one of which is transparent, and wherein the electrophoretic display fluid comprises a first set of particles and a second set of particles each dispersed in a transparent liquid system, the first set of particles exhibiting a color different from and contrasting to a color of the second set of particles, and wherein the first set of particles are magnetic particles while the second set of particles are non-magnetic particles, the method comprising appropriately applying an electric field and a magnetic force to a selected individual reservoir in a manner to cause either the first set of particles or the second set of particles to be displayed.

In embodiments, the invention is also directed to an electrophoretic display device comprising a multiplicity of individual reservoirs, each containing an electrophoretic display fluid, located between two conductive film substrates, at least one of which is transparent, wherein the electrophoretic display fluid comprises a first set of particles and a second set of particles each dispersed in a transparent liquid system, the first set of particles exhibiting a color different from and contrasting to a color of the second set of particles, and wherein the first set of particles are magnetic particles while the second set of particles are non-magnetic particles, the electrophoretic display device further including an electric field application apparatus and a magnetic force application apparatus, both the electric field application apparatus and a magnetic force application apparatus being capable of being applied to each of the individual reservoirs separately.

Further, in embodiments, the invention is also directed to a method of maintaining an operation of an electrophoretic display device, the electrophoretic display device comprising a multiplicity of individual reservoirs, each containing an electrophoretic display fluid, located between two conductive film substrates, at least one of which is transparent, and wherein the electrophoretic display fluid comprises a first set of particles and a second set of particles each dispersed in a transparent liquid system, the first set of particles exhibiting a color different from and contrasting to a color of the second set of particles and also exhibiting a different charging property from the second set of particles, the method comprising applying an electric field to an individual reservoir at risk of having particle agglomerations form therein for a period of time sufficient to prevent the formation of particle agglomerations and to break-up any particle agglomerations that may have formed.

BRIEF DESCRIPTION OF THE DRAWINGS

FIG. 1 illustrates a side view of an electrophoretic display device of one embodiment of the invention in an off position, while

FIG. 4 illustrates a side view of an electrophoretic display device in accordance with another embodiment of the invention in an off position in which the display include magnetic force attracting magnetic particles, while

DETAILED DESCRIPTION OF PREFERRED EMBODIMENTS

Structures of electrophoretic display devices that may be used in the present invention will first be detailed. Use of the electrophoretic display fluids described herein is not, however, necessarily limited to these most preferred embodiments, and any other suitable design for an electrophoretic display device may be used without limitation.

Figure 1:
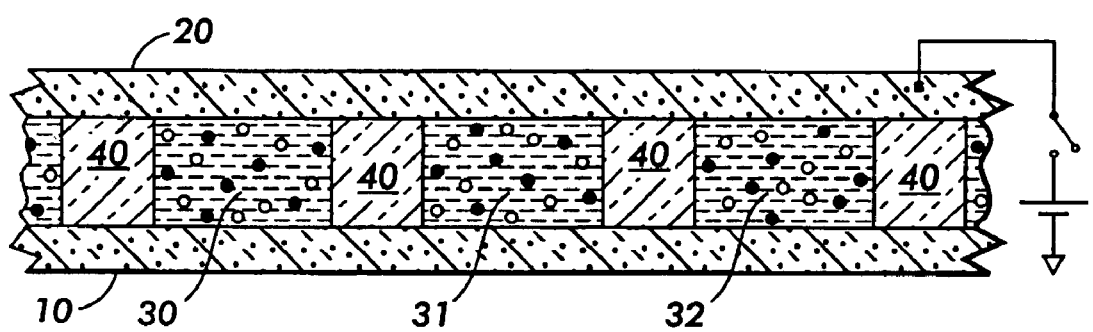

As illustrated in FIG. 1, a first embodiment of the electrophoretic display device of the invention comprises two conductive film substrates 10 and 20 disposed oppositely of each other.

As the conductive film substrates of the electrophoretic display device, any materials known and used in the art may be selected. At least one of the conductive film substrates, in particular at least the top conductive film substrate through which the images formed by the device must be viewed, should be transparent in order to enable such viewing. Both substrates may be transparent, if desired. Of course, the bottom or back substrate need not be transparent, and may instead be, for example, a light reflecting or light absorbing material. As suitable materials that may be used, mention may be made of conductive plastic films, for example plastic films coated with indium tin oxide (ITO) such as polyethylene terephthalate (PET) films, conductive glass films, such as ITO coated glass, and conductive thin metals. For transparency, ITO coated plastic and glass films are preferred.

Preferably, the substrates that sandwich the spacer layer therebetween have a length and width corresponding to the overall length and width of the electrophoretic display device. The substrates are thus preferably continuous, unitary films that are not separated over just individual reservoirs of the display device. The substrates are preferably made to be as thin as possible while still maintaining appropriate conductive properties and structural integrity. For example, the substrates should have a height (i.e., thickness) of from about 20 microns to about 100 microns.

Between the conductive film substrates are contained a multiplicity of individual reservoirs (30, 31, 32), each filled with a display fluid (i.e., a liquid electrophoretic display fluid) described more fully below. Each of the individual reservoirs defines one container and/or cell of the electrophoretic display fluids within the display device.

A spacer 40 keeps the individual reservoirs separate from one another. Any suitable spacer design may be used. However, the spacer is preferably of the type described in co-pending U.S. patent application Ser. No. 09/683,547 filed on even date herewith and incorporated herein by reference in its entirety. As described therein, the width and/or diameter of the individual reservoirs are preferably from, for example, about 5 microns to about 200 microns. Obviously, the display liquid to be used within the reservoirs must contain particles of a size smaller than the reservoir width/diameter in order to function. The solid portion of the spacer separating the multiplicity of reservoirs, i.e., the partitions between individual reservoirs of the spacer layer, should preferably be as thin as possible. Preferred partition thicknesses are on the order of, for example, about 10 microns to about 100 microns, more preferably about 15 to about 50 microns.

The display device may have any suitable overall length and width as desired. The electrophoretic display device may also be made to have any desired height, although a total height of from about 30 to about 400 microns is preferred in terms of size and ease of use of the device.

In forming the electrophoretic display device, the reservoirs of the spacer are filled with display liquid and the spacer layer is attached to a first, or bottom, conductive film substrate. The filling of the reservoirs and attachment of the sheet may be done in any suitable order. The attachment of the spacer layer to the first conductive film substrate may be done by any suitable method. Adhesive is preferably used for convenience. Once the reservoirs are filled with display liquid and the spacer/spacers is/are attached to the first conductive film substrate, the second, or top, conductive film substrate, which must be transparent, is attached to seal the reservoirs. Again, this attachment of the second conductive film substrate may also be done by any suitable means, including gluing with an adhesive.

Figure 3:
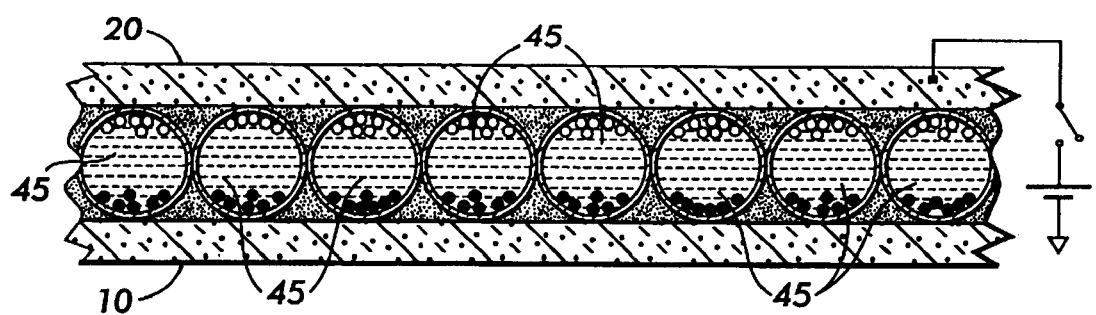
FIG. 3 illustrates a side view of an electrophoretic display device in accordance with another embodiment of the invention in which the display fluids are encapsulated in individual microcapsules.

A second embodiment of a suitable electrophoretic display device is illustrated in FIG. 3. As illustrated in FIG. 3, the electrophoretic display device again comprises two conductive film substrates 10 and 20 disposed oppositely of each other. However, between the conductive film substrates in this embodiment are located a multiplicity of microspheres (each labeled 45) as containers/cells that encapsulate the electrophoretic display fluid therein. The encapsulated microspheres are held in a suitable matrix material. A similar electrophoretic display device utilizing encapsulated microspheres is described in U.S. Pat. No. 6,017,584, incorporated herein by reference in its entirety. Preferably, the microspheres are made to have a size (diameter) within the range discussed above for reservoir width/diameter.

In this embodiment, the encapsulated microspheres are first prepared. These encapsulated microspheres are then glued onto one of the conductive film substrates of the device.

For making the encapsulated microspheres of this embodiment, any suitable method of encapsulation may be used. The process of encapsulation may include conventional coacervation, interfacial polymerization, in-situ polymerization, electrolytic dispersion and cooling, or spray-drying processes. The microcapsules can also be prepared by a process utilizing isocyante-polyol, urea-formaldehyde-resorcinol, melamine-formaldehyde resins, or hydroxypropyl cellulose wall-forming materials.

Preferred microcapsules can have a multi-layer wall around the core solid and/or liquid encapsulants. These can be made, for example, by first forming a thin wall by an interfacial polymerization reaction, and subsequently forming a second, thicker wall by an in-situ polymerization reaction or by a coacervation process. The first wall of the microcapsule may be typically comprised of polyurea, polyurethane, polyamide, polyester, epoxy-amine condensates and silicones. The second wall of the microcapsule may be typically comprised of condensates of melamine-formaldehyde, urea-formaldehyde, resorcinol-formaldehyde, phenol-formaldehyde, gelatin-formaldehyde, or interpolymer complexes of two oppositely charged polymers such as gelatin/gum arabic and poly(styrene sulfonic acid)/gelatin.

Preferably, a semi-continuous miniemulsion polymerization process is used to encapsulate the electrophoretic display fluid. This process categorically is an emulsion polymerization, since the primary particles of the display fluid are dispersed in a monomer or any mixture of monomers, with a polymerization subsequent to the emulsification step. The miniemulsion process is employed to create an oil-in-water miniemulsion of primary particles and monomers initially. Then the miniemulsion along with initiator will be continuously added into the reactor at elevated temperature to perform emulsion polymerization.

The encapsulation of the particles using the miniemulsion polymerization process offers certain advantages over other conventional methods such as the direct dispersion of the particles in the oil medium, rather than in the water phase, by using homogenization in the presence of surfactants. A homogenization is used to provide the shear needed to create the miniemulsion, with the particles located inside the miniemulsion droplets. A semi-continuous addition of miniemulsion to the reactor system will provide better latex stability and particle encapsulation efficiency.

Miniemulsions are relatively stable submicron (50 to 500 nm) dispersions of oil (monomer) in water prepared by shearing a system containing monomers, water, surfactant, co-surfactant, and additionally, the colored particles. The principle behind the making of stable miniemulsions is the introduction of a low molecular weight and relatively water-insoluble compound (a co-surfactant) inside the monomer droplets to substantially retard the diffusion of monomer and particles out of emulsion droplet. A co-surfactant usually consists of a long chain alcohol or alkane of at least 12 carbon atoms in length. The enhanced stability in miniemulsions is attributed to the formation of intermolecular complexes at the oil/water interface. These complexes would be liquid condensed and electrically charged creating a low interfacial tension and high resistance to pigment transport/leaching.

In conventional emulsion polymerization (in the absence of a long chain alcohol or alkane surfactant and/or high shear), the primary mechanisms of particle nucleation are micellar and/or homogeneous nucleation, i.e., the principal locus of particle nucleation is the aqueous phase or the monomer-swollen micelles. Monomer droplets (>1000 nm) are only considered to act as monomer reservoirs supplying monomer to the growing polymer particles. In contrast, miniemulsion polymerization utilizes a surfactant/co-surfactant system to produce small (50–500 nm) monomer droplets. The small droplet size, and consequent large droplet surface area, in a miniemulsion results in most of the surfactant being adsorbed to the droplets with little free surfactant available to form micelles or stabilize aqueous-phase polymerization. Hence, there may be little or no micellar or homogeneous nucleation. The droplets become the primary locus of particle nucleation. Particle nucleation in miniemulsion polymerization is predominantly from small monomer droplets stabilized against Ostwald ripening.

Long chain aliphatic mercaptans such as dodecyl mercaptan are commonly used as chain transfer agents to regulate polymer molecular weight in emulsion polymerization. They are water-insoluble and could be used as hydrophobes to stabilize the miniemulsion droplets against monomer diffusion and particle colorant leaching. The miniemulsions stabilized with long chain aliphatic mercaptans should be thermodynamically stable. When these chain transfer agents are also functionalized as co-surfactants in a miniemulsion polymerization process, pigment can be more easily incorporated into the polymer particles, resulting in a homogeneous display fluid (that includes colored particles) encapsulated latex composition.

A benefit of encapsulating the electrophoretic display fluid in accordance with the above methods is that the encapsulating microspheres can be made to be spherical as shown in FIG. 3 or other than spherical through control of the process. Different shapes may permit better packing density of the microspheres and better display quality.

Once generated, the encapsulated microspheres are then adhered to one of the conductive film substrates of the device, for example using any suitable binder polymer matrix material that is either mixed with the microspheres prior to coating or coated upon the microspheres after placement upon the substrate. The microspheres are preferably arranged in abutting, side-by-side relationship and preferably in a monolayer (i.e., the microspheres preferably are not stacked) between the two conductive film substrates.

Next, the electrophoretic display fluids for use in the electrophoretic display device will be described.

The electrophoretic display fluid of the present invention is comprised of at least one set of colored particles dispersed in at least one liquid system.

In one embodiment of the invention, the electrophoretic display fluid comprises one set of particles dispersed in a colored liquid system, the particles exhibiting different, contrasting color to the color of the liquid. The colored liquid system may preferably comprise two immiscible liquids having different densities such that the immiscible liquid having a density less than that of the other immiscible liquid rests on top of the other immiscible liquid, and the set of particles preferably has a density in between the densities of the two immiscible liquids such that the particles rest at an interface between the two immiscible liquids, as explained in more detail below. Preferably, the particles are emulsion/aggregation particles as detailed below.

The liquid system may be colored by any suitable means in the art, including through the inclusion of any suitable colorants (e.g., dyes and/or dispersible pigments) therein.

In a second embodiment, the electrophoretic display fluid comprises two sets of particles dispersed in a preferably transparent liquid system (although it may be useful to also color/tint the liquid system), the two sets of particles exhibiting different, contrasting color and different charging properties from each other.

The liquid system may be comprised of a single fluid, or it may be a mixture of two or more fluids, which mixture of fluids may either be miscible with each other or immiscible as described below. The liquid system preferably contains from about 50 to about 95% by weight of the liquid system and about 5 to about 50% by weight of the sets of particles, the separate sets of particles preferably being each contained in the display fluid in approximately equal amounts. The liquid of the liquid system and the sets of particles therein preferably have densities that are matched, i.e., the densities of these materials are within about 10% of each other.

The liquid system may be comprised of any suitable liquid known in the art for display fluids. Preferably, the liquid is clear or transparent and does not itself exhibit any color, although again such is not prohibited by the present invention as discussed above. The choice of liquid may be based on concerns of chemical inertness, density matching to the particles to be suspended therein and/or chemical compatibility with the particles. The viscosity of the fluid should be relatively low to permit the particles to move therein, for example under the influence of an electrical field. The fluid is preferably dielectric and substantially free of ions. The fluid preferably has minimum solvent action on the colored particles and a specific gravity about equal to the colored particles.

Organic solvents, such as halogenated organic solvents, saturated linear or branched hydrocarbons, silicone oils, and low molecular weight halogen-containing polymers are a few suitable types of liquids. Useful organic solvents include, but are not limited to, epoxides, such as, for example, decane epoxide and dodecane epoxide; vinyl ethers, such as, for example, cyclohexyl vinyl ether; and aromatic hydrocarbons, such as, for example, toluene and naphthalene. Useful halogenated organic solvents include, but are not limited to, tetrafluorodibromoethylene, tetrachloroethylene, trifluorochloroethylene, 1,2,4-trichlorobenzene, and carbon tetrachloride. These materials have high densities. Useful hydrocarbons include, but are not limited to, decane, dodecane, tetradecane, xylene, toluene, hexane, cyclohexane, benzene, the aliphatic hydrocarbons in the ISOPAR® series (Exxon), NORPAR® (a series of normal paraffinic liquids from Exxon), SHELL-SOL® (Shell), and SOL-TROL® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane and polydimethylsiloxane. These materials usually have low densities. Useful low molecular weight halogen-containing polymers include, but are not limited to, poly(chlorotrifluoroethylene) polymer or KRYTOX® from Dupont.

Furthermore, the liquid system may contain additives such as surface modifiers to modify the surface energy or charge of the particles. Charge control agents, charge directors, dispersants, and surfactants can also be added to the suspending fluid to improve the performance of the system.

In an additional embodiment of the invention, the liquid system may be comprised of two immiscible liquids. This two-layer liquid system may be achieved using two fluids with differing densities and that are immiscible with each other. 3M's flourether and Exxon's ISOPAR® M are a suitable combination. Flouroether, being denser, rests on the bottom, while ISOPAR®, being less dense, rests on top. The particles of the display liquid should have a density that is in between the densities of the two immiscible liquids so that they rest at the interface between the two layers to create the desired suspension.

There are several advantages of using two immiscible liquids. Firstly, the rest position of the particles is at the interface of the two immiscible liquids (which is most preferably near the middle portion of the reservoir) rather than at the bottom of the reservoir in which the display liquid is contained. This minimizes the adhesion between the particles and the reservoir (e.g., the encapsulation shell). Secondly, switching time is made faster since the particles only need to travel a portion of the distance of the reservoir, e.g., half of the distance. Thirdly, the particles rested at the interface break loose easily compared to particles resting at the bottom. This can increase the particle stability and the product life.

The particle sets dispersed in the liquid system will next be described with particularity in the several embodiments of the invention.

Where two differently colored particle sets are employed, the particles of each of the sets are each of a different color, for example most typically black and white. The sets of particles should preferably be of contrasting colors, e.g., one set should be light in color such as white while the other set of particles should be dark in color, e.g., black. Also, each set of colored particles possesses at least one different electrophoretic property. By this is meant that the different sets of colored particles must possess a different property that enables the different particles to be manipulated, for example by an electrical field, magnetic field, etc., such that the different sets of particles respond differently to the manipulation and thus the reservoirs containing the display liquid of the display device can exhibit the color of the desired set of colored particles.

Figure 2:
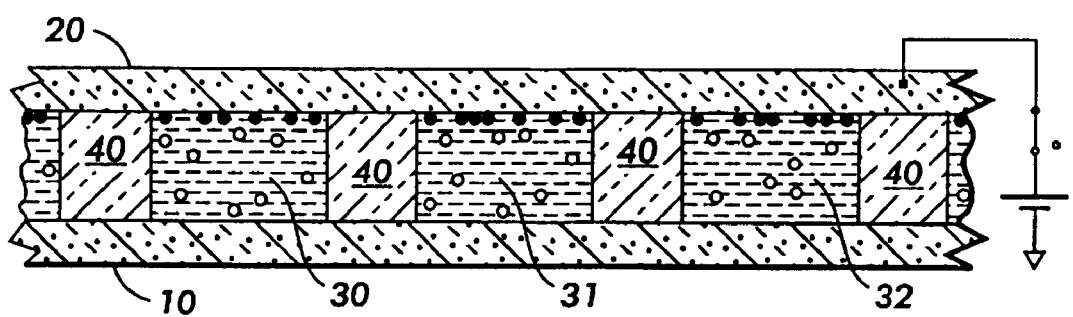
FIG. 2 illustrates the same electrophoretic display device in an on position.

For example, the sets of colored particles preferably possess different charge properties, e.g., one set of colored particles is charged while a second set of colored particles is either not charged or is charged oppositely of the first set of colored particles. FIGS. 1 and 2 illustrate an embodiment where a first set of white particles is not charged while a second set of black particles is charged. Since white particles are not charged in the liquid system, it will not move under electrical field, whereas the colored particles are moving under the field. FIG. 1 shows that when no electrical field is applied, i.e., the field is in the off position, the colored (black) particles are scattered inside the reservoirs and therefore the color seen from the top surface is white. FIG. 2 shows that when the electrical field is applied, i.e., the on position, the colored (black) particles move to the top surface, and thus the color image appears.

In a first embodiment of the particles, LID (Liquid Ink Development) and CEP (Contact Electrostatic Printing) technology (also known as reverse charge printing (RCP) as in U.S. Pat. No. 6,203,961) are joined. LID is preferably charged liquid toner dispersed in hydrocarbon fluid such as ISOPAR®. The particle concentration may vary, but is generally from about 1 to about 10% by volume, preferably about 2% by volume. CEP is similar to LID, except that the particles are not charged. Thus, for example, a white particle based upon CEP and a colored particle based upon LID are prepared and mixed together to make a liquid system, i.e., to make the display liquid to include within the reservoirs of the electrophoretic display device. LID processes for the preparation of toners are illustrated in a number of Xerox patents, the disclosures of which are totally incorporated herein by reference, for example U.S. Pat. No. 5,866,292. CEP processes for the preparation of toners are also illustrated in a number of Xerox patents, the disclosures of which are totally incorporated herein by reference, for example U.S. Pat. No. 6,203,961. The following is an example LID or CEP/RCP method for making the electrophoretic inks.

The liquid electrostatic developer of the present invention can be prepared by a variety of processes such as, for example, mixing in a nonpolar liquid the thermoplastic resin, charge control agent, and colorant in a manner that the resulting mixture contains, for example, about 30 to about 60 percent by weight of solids; heating the mixture to a temperature of from about 40° C. to about 110° C. until a uniform dispersion is formed; adding an additional amount of nonpolar liquid sufficient to decrease the total solids concentration of the developer to about 2 to about 30 percent by weight; cooling the dispersion to about 10° C. to about 30° C.; adding an optional charge director compound such as an aluminum compound to the dispersion; and diluting the dispersion.

In the initial mixture, the resin, colorant and charge control agent may be added separately to an appropriate vessel such as, for example, an attritor, heated ball mill, heated vibratory mill, such as a SWECO MILL manufactured by Sweco Company, Los Angeles, Calif., equipped with particulate media for dispersing and grinding, a ROSS double planetary mixer manufactured by Charles Ross and Son, Hauppauge, N.Y., or a two roll heated mill, which usually requires no particulate media. Useful particulate media include materials like a spherical cylinder of stainless steel, carbon steel, alumina, ceramic, zirconia, silica and sillimanite. Carbon steel particulate media are particularly useful when colorants other than black are used.

A typical diameter range for the particulate media is in the range of about 0.04 to about 0.5 inch (approximately 1.0 to approximately 13 millimeters).

Sufficient nonpolar liquid is added to provide a dispersion of from about 30 to about 60 percent solids. This mixture is then subjected to elevated temperatures during the initial mixing procedure to plasticize and soften the resin. The mixture is sufficiently heated to provide a uniform dispersion of all the solid materials of, for example, colorant, charge director, charge control, and resin. However, the temperature at which this step is undertaken should not be so high as to degrade the nonpolar liquid or decompose the resin or colorant if present. Accordingly, the mixture in embodiments is heated to a temperature of from about 50° C. to about 110° C., and preferably from about 50° C. to about 80° C. The mixture may be ground in a heated ball mill or heated attritor at this temperature for about 15 minutes to about 5 hours, and preferably about 60 to about 180 minutes.

After grinding at the above temperatures, an additional amount of nonpolar liquid may be added to the dispersion. The amount of nonpolar liquid to be added should be sufficient in embodiments to decrease the total solids concentration of the dispersion to about 10 to about 30 percent by weight. The dispersion is then cooled to about 10° C. to about 30° C., and preferably to about 15° C. to about 25° C., while mixing is continued until the resin admixture solidifies or hardens. Upon cooling, the resin admixture precipitates out of the dispersant liquid. Cooling is accomplished by methods such as the use of a cooling fluid like water, glycols such as ethylene glycol, in a jacket surrounding the mixing vessel. Cooling is accomplished, for example, in the same vessel, such as an attritor, while simultaneously grinding with particulate media to prevent the formation of a gel or solid mass; without stirring to form a gel or solid mass, followed by shredding the gel or solid mass and grinding by means of particulate media; or with stirring to form a viscous mixture and grinding by means of particulate media. The resin precipitate is cold ground for about 1 to about 36 hours, and preferably from about 2 to about 4 hours. Additional liquid may be added at any time during the preparation of the liquid developer to facilitate grinding or to dilute the developer to the appropriate percent solids needed for developing. Thereafter, the charge director is added. Other processes of preparation are generally illustrated in U.S. Pat. Nos. 4,760,009; 5,017,451; 4,923,778; 4,783,389, the disclosures of which are totally incorporated herein by reference.

As the particles of the particle sets, any particles capable of being colored and charged may be used. Preferably, toner particles are used as at least one of the colors of the colored particle sets.

In a first preferred embodiment, the particles are comprised of emulsion/aggregation (E/A) particles, i.e., particles prepared by the known emulsion/aggregation technique. A major advantage in the use of E/A particles as the particles of the display fluid are that E/A particles have a very narrow particle size distribution, which provide more uniform movement of the particles within the system, less likelihood of agglomeration problems during use, and better display quality.

Emulsion/aggregation processes for making particles, for example colored particles, in which the particles are achieved via aggregation as opposed to particle size reduction, are well known, and include the steps of, e.g., emulsion, aggregation, coalescence, washing and drying. For example, emulsion/aggregation processes for the preparation of toners are illustrated in a number of Xerox patents, the disclosures of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797. Also of interest may be U.S. Pat. Nos. 5,348,832, 5,405,728, 5,366,841, 5,496,676, 5,527,658, 5,585,215, 5,650,255, 5,650,256 and 5,501,935. The E/A process is not limited in the use of certain polymers for toner, although polyesters and acrylic based polymers (e.g., styrene acrylate) are convenient for use in the process, the use of polyesters having the further advantage of not requiring the use of any surfactants in making the particles. Fluoropolymers may also be used, these polymers showing excellent charge properties in hydrocarbons.

E/A particles may be made to have a suitably small size, for example on the order of from about 1 to about 10 microns, more preferably from about 1 to about 5 microns, with an excellent particle size distribution, particularly compared to the scattered distribution typically exhibited from toners prepared by grinding techniques. In addition, E/A particles can have specific surface treatments and shapes depending on the process condition, which can be important parameters in the electronic paper application.

Also, in embodiments of the present invention is a process for the preparation of compositions with controlled particle size and morphology; or further shearing, for example, in the attritor, or further shearing with heating; and allowing the formation of electrostatically stabilized aggregates ranging from, for example, about 0.5 microns to about 10 microns in size with various morphologies ranging from morphologies resembling a bunch of grapes to morphologies of flakes; followed by heating above the resin Tg, for example about 5° C. to about 50° C. above, to cause the coalescence of the latex, pigment particles and to tune the morphology of the particles by changing the temperature of the coalescence and/or the time of coalescence which will allow the achievement of morphologies ranging from raspberries, cauliflower, flakes, potatoes to spheres; or for example, (i) preparing a pigment dispersion in water, which dispersion is comprised of a pigment, an ionic surfactant and optionally a charge control agent; (ii) shearing the pigment dispersion with a negatively charged polymeric latex comprised of resin of submicron size, a counterionic surfactant with a charge polarity of opposite sign to that of the ionic surfactant and a nonionic surfactant thereby causing a flocculation or heterocoagulation of the formed particles of pigment, resin and charge control agent to form a uniform dispersion of solids in water and surfactant; (iii) (a) continuously stirring and heating the above sheared blend to form electrostatically bound aggregates with the morphology of grapes; or (iii) (b) further shearing the above blend to form electrostatically bound well packed aggregates; or (iii) (c) continuously shearing the above blend, while heating to form aggregated flake like particles; (iv) heating the formed statically bound aggregated particles above the Tg of the resin particles to provide coalesced particles; (v) separating the particles from water and surfactant by filtration; (vi) mixing the particles with dielectric fluid in the attritor.

In the foregoing, the temperature above the resin Tg (step iv) primarily controls the morphology of the particles obtained. The morphology of the particles may be made to include any of grape, cauliflower, raspberry, potato and perfect spheres.

The density of the particles ranges from about 0.85 $cm^3/g$ to about 3.5 $cm^3/g$ with varied pigment to resin ratio. Pigment density ranges from about 1.1 cm/g to about 6 cm/g and resin density ranges from 0.8 cm/g to about 2 cm/g. The higher the pigment to resin ratio, the higher the particle density.

The effective surface area is calculated as the total surface area divided by the total volume. A perfect and smooth spherical particle would have the least amount of effective surface area under the same volume. The roughness and the shapes of the particles can be adjusted from about 1 to about 100 times higher than the effective surface area of spheres by changing the shapes from spherical to grape, or flakes, or other non-spherical shapes. The effective surface area affects the contact areas of particles and the charging levels of the particles.

As one example, about 10% to about 30% by weight dry E/A particles (about 5 microns in average particle diameter) are mixed with ISOPAR® and steel balls to make LID liquid system with E/A particles. The charge level may be varied with different charge directors. Two types of E/A particles can be made with contrasting color. For example, one set of particles is charged and the other is not; or both are charged, but oppositely.

The advantages of E/A particles over conventional LID toner are several folds. Firstly, there is better (narrower) particle size distribution. The size of E/A particles can be easily controlled as well. Secondly, the surface of E/A particles can be adjusted by coalescence and washing process. Thirdly, the shape of particles can be from irregular shape to perfect spherical shape as discussed above. This provides a good range of different particles for optimizing the particle mobility and stability in the display application. Fourthly, E/A processes can provide a very small particle size, for example, less than 2 microns. This range of size cannot be achieved with conventional grinding processes without the addition of costly equipment and extremely low yields.

In preferred embodiments, use is made of E/A particles in which the charging characteristics have been altered by inclusion of charge control additives, which include charge enhancing additives.

In one aspect of this embodiment of particles, the E/A particles contain internal charge controlling additives (CCA) in the emulsion or aggregation process steps of making the E/A particles. Thus, the CCA materials can be dispersed as emulsion and added into the aggregation process. Charge controlling additives, which are present in the particles in various effective amounts, such as from about 1 to about 20, and preferably from about 0.5 to about 5, weight percent include known additives, preferably such as distearyl dimethyl ammonium methyl sulfate, and cetyl pyridinium halide, especially the chloride and bisulfides, and mixtures thereof. Examples of specific positive charge controlling additives include alkyl pyridinium halides, and preferably cetyl pyridinium chloride, reference U.S. Pat. No. 4,298, 672, the disclosure of which is totally incorporated herein by reference, organic sulfates and sulfonates, reference U.S. Pat. No. 4,338,390, the disclosure of which is totally incorporated herein by reference, distearyl dimethyl ammonium methyl sulfates (DDAMS), reference U.S. Pat. No. 4,560, 635, the disclosure of which is totally incorporated herein by reference, and the like. Examples of a negative charge controlling additive include the aluminum complexes mentioned herein, such as BONTRON E-88™ and E-84™, available from Orient Chemical Company of Japan, and other known negative charge controlling additives.

The particles can possess a negative or positive charge of about 10 to about 45 microcoulombs per gram, and preferably from about 15 to about 25 microcoulombs per gram, which charge is dependent on a number of known factors including the amount of charge controlling additive present and the composition of the other components such as the resin, passivation, and the pigment.

By this method of incorporating CCA materials into an E/A particle, the addition of CCA can be done with the regular E/A process, which requires no extra reactors for the process. The surface exposure of the CCA on E/A particle can be controlled during the process. The CCA can be 100% buried under the particle surface or can be extensively exposed on the particle surface. This capability can help the optimization of the CCA level for best charging results.

In a second aspect of this embodiment, the CCA can be made to be a part of the resin itself. For example, a sulfonated group or quaternary ammonium group may be made to be present on the side chain or in the main chain of the resin. In general, E/A resin contains 1–2% of acrylic acid to enhance the stability of emulsion. In addition to the presence of acrylic acid or to replace the acrylic acid, monomers with different chargeable groups, such as sulfonated groups, amino groups, quaternary ammonium groups or acidic groups, that can provide better charge on the particle surface can be incorporated into or onto the chain of the E/A resin. For example, a polyester resin containing sulfonated groups may be readily dispersed in hydrocarbon, and this resin has more negative charge than the resin without the sulfonated groups.

In a third aspect of this embodiment, the surface of the E/A particle may be modified after formation of the particle to have better charge properties. The surface modification may be physical absorption of CCA or chemical reaction of active groups on the particle surface with chargeable chemicals. For example, silylating agents can be chemically bonded to the E/A particle surface. Another example is that chemicals with amine groups can react with an acidic group on the particle. Through the reaction, the E/A particle surface can be charged either positively or negatively, which enables the particle movement under the electrical field.

Surface modification is a common reaction process, for example, in the modification of toner additive surface such as $SiO_2$, $TiO_2$, $TiO(OH)_2$, $Al_2O_3$, etc. For example, chemicals with silane groups can react with the hydroxyl group on the particle surface. The reacted product contains a very thin layer of coating that can provide hydrophobic properties for the particles and the reacted surface can provide better charge properties. The charge is chemically bonded onto the particle surface and therefore, there would be no CCA fall-off and charge reduction problems.

In a fourth aspect of this embodiment concerning the use of E/A particles, white pigment dispersion may be used in the aggregation processes, in particular for deriving particles that will exhibit white color in the display. Common white pigments include, for example, $TiO_2$, $Al_2O_3$, calcium carbonate, talc, etc. CCA materials such as mentioned above may also be optionally added into the aggregation process for better charge properties.

Of course, the invention is not necessarily limited to the preferred use of E/A particles as the particles of the display fluid. Conventional colored particles such as toners, for example of the type prepared by melt-mixing the polymer and colorant, grinding, classifying and optional blending, may also be used. Such conventional toners are well known in the art, including the polymers and colorants used to make such toners, and are readily commercially available from any number of suppliers, and thus need not be described in detail herein. During the grinding and classification processes, a wide range of particle sizes, e.g., from about 1 micron to about 20 microns in average particle diameter, may be generated.

Preferably, the conventional toner particles are modified with CCAs as discussed above with respect to the E/A particles.

First, this may be done by including an internal CCA in the dry toner by including the additive in the melt-mixing process. That is, the additives may be dispersed in the extruder or Banbury equipment. The blending of surface additives to improve particle stability can be done prior to the dispersion of hydrocarbon (the wet process), which would not create process complexity between the dry and wet processes.

Second, the surface of the toner may be modified to have better charge properties and particle stability. Again, the surface modification may be physical absorption of the additive or chemical reaction of active groups on the toner surface with chargeable chemicals. The surface modification may be done between the dry and wet processes, i.e., after formation of the toner but prior to incorporation of the toner into the liquid system. The surface modification may have the additional benefit of improving the stability of the dispersion. For example, polymers such as polyethylene oxide can be grafted onto the surface of the toner particles for steric hindrance effect for particle stability.

Third, the additive may be made to be a part of the toner resin. For example, the sulfonated group or quaternary ammonium group can be on the side chain or in the main chain of the toner resin. In general, dry xerographic toner resin, such as polyesters, styrene-butadiene copolymers, styrene-acrylate copolymers, etc. contain low acid numbers. Adding monomers with chargeable groups, such as sulfonated groups, amino groups, quaternary ammonium groups, or acidic groups, can provide better charge on the toner surface.

Also as was discussed above for the E/A particles, it is possible to readily prepare white-colored toner from conventional toners by adding white pigment into the melt-mixing process.

In another embodiment of the particles, use may be made of colored hollow particles, for example most preferably as at least the white particles of the display fluid. Among color-copied images, white-copied images are formed on colored copying paper (e.g., black paper), providing striking contrast images that have a beauty different than black-copied images on white paper. White particles are constituted of pigments represented by titanium dioxide, binder resin and additives, etc. When copied images are formed with white particles, the hiding properties of the particles become an issue. Black-copied images do not appear unclear even if the hiding properties are poor. But white-copied images do appear unclear, even if the white particles have hiding properties comparable to that of black particles. Hiding property is defined as the power to hide a background such as copying paper when particles are fixed on the background. In general, conventional white particles have insufficient hiding power to form white images without showing an unclear appearance. The reason is that the $TiO_2$ particles agglomerate and interfere with each other's ability to scatter light, especially at high $TiO_2$ loading.

To address this, it has now been found to be possible to use hollow polymer particles as white particles, preferably made by an emulsion polymerization process, for making LID white particles. A primary advantage of this is that the hollow polymer particles are spherical and that the particle size is extremely fine (e.g., from sub-microns to several, e.g., about 10, microns). These hollow particles are more stable against flocculation and provide excellent hiding properties.

Hollow polymer particles are a substitute opacifier for titanium dioxide ($TiO_2$) in paints and printing inks. Hollow polymer particles consist of hollow polymer (e.g., acrylic/styrene polymer) beads and are a non-film-forming aqueous emulsion polymer. The opacifying power of a hollow polymer particle is derived from its core-shell structure. After the hollow polymer particles are dried, the water permanently diffuses from the core of its polymeric beads and is replaced by air. Air typically has a refractive index of about 1.0, while a crosslinked polymer shell such as styrene/acrylic polymer has a refractive index of about 1.5. These encapsulated air voids of hollow polymer particles deflect light at four different points: (1) where it passes into the polymeric shell, (2) where it passes from the shell to the encapsulated air at its center, (3) where it passes from the center to the polymeric shell on the other side of the particle, and (4) where it exits the shell.

Hollow polymer particles may be prepared by a sequential emulsion polymerization process, which is based on the core-shell structured particles having alkali-swellable polymer as the core. The process may comprise preparing an alkali-swellable polymer latex by polymerizing a monomer mixture comprising non-acid hydrophilic monomers and carboxylic monomers; encapsulating the core particle by a second stage polymerization of the monomers resulting in crosslinked, hard polymers; neutralizing and swelling the resulting latex particles by volatile bases such as ammonia or a tertiary amine at high temperature; then drying the neutralizing latex particles at room temperature and then generating internal voids through diffusion of water from inside the particles.

Compared with the unevenly shaped particles of $TiO_2$ and other with pigments such as zinc flower, antimony white or zinc sulfide, the hollow polymer particles prepared by the emulsion polymerization process should be more spherical and uniform in size.

The benefits of employing hollow polymer particles derive from their ability to hide more efficiently than $TiO_2$ at high levels. $TiO_2$ has a high index of refraction and is therefore a very efficient light-scatterer at low concentrations. Principles of colloidal chemistry indicate that particle interaction increases as particle size decreases. In emulsion aggregation processes, pigments aggregate with polymer latexes to form chemical particles. The active pigment comprises primary particles having a very small radius of curvature, usually in the particle diameter range of 100 to 300 angstroms. Such sub-micron particles have a tendency to flocculate, and to form elongated structures that form a micron size domain within E/A particles. At higher levels, $TiO_2$ particles crowd and interfere with each other's ability to scatter light. For that reason, the pigment's hiding efficiency drops as usage rises. Although less efficient at scattering light than $TiO_2$, the hollow polymer particles are not affected by high pigment levels. The shells of the hollow polymer particles can keep the air voids they enclose from crowding each other, so they lose no hiding power.

Hollow particles have two primary effects. One is to increase the light scattering due to the reflective index difference in the interface so that the particle will look whiter. Thus, such particles are usually not tinted, i.e., they are the white color particles of a display fluid. Second, the void or the air bubble inside the hollow particles is used to adjust the overall particle density.

Other than the hiding power mentioned above, there are several other advantages in using hollow particles. Firstly, the hollow polymer particles are commercially available from manufacturers such as Rohm & Haas. Secondly, the density of these particles is much lower than that of the particles with $TiO_2$, which provides an opportunity to match the particle density with the density of the hydrocarbon. The density match is important since it improves the stability of the particle suspension. Thirdly, the particle sizes are much smaller than conventional toner particle sizes, which increases the particle stability. Fourthly, the shape of this hollow particle is spherical, which cannot be so uniformly created with conventional toner processes.

The hollow polymer particles are combined with dark-colored particles in the liquid system in order to make the display fluid.

In another preferred aspect of this embodiment of the present invention, hollow polymer particles are used in making E/A particles as discussed above. In other words, a liquid system made of E/A white particles that contain hollow polymer particles as white pigment is used as the display fluid in a thin film device (electronic page) that can display image under an electric field. A primary advantage of this aspect of the embodiment is that the hollow polymer particles are spherical and can be fully compatible with E/A latexes, since the particles can be prepared by the same surfactant(s) as the E/A latexes used. They remain more stable against flocculation, so that a uniform stable pigment dispersion will result in E/A particles. White E/A particles made by hollow polymer particles will thus provide excellent hiding properties.

The emulsion aggregation (E/A) process for making particles utilizes latexes produced by emulsion polymerization. Particles made by emulsion/aggregation processes result in small particles (e.g., about 1 to about 8 $\mu$m) with a narrow geometric standard deviation (GSD) (e.g., about 1.05 to about 1.35). Use is here made of hollow polymer particles as white pigment, made by emulsion polymerization process, for making E/A white particles.

In emulsion/aggregation processes, pigments aggregate with polymer latexes to form chemical particles. The active pigment comprises primary particles having a very small radius of curvature, usually in the particle diameter range of about 100 to about 300 Angstroms. Such submicron particles have a tendency to flocculate, and to form elongated structures that form a micron size domain within E/A particles.

Additives such as CCA materials may again be optionally added into the aggregation process for better charge properties.

In another particle embodiment of the present invention, one or more sets of the particles of the display fluid, and in particular sets of emulsion/aggregation particles, are encapsulated in a metal oxide shell, preferably a titania shell or silica shell.

Titania particles and silica particles possess electrophoretic migration capabilities under application of an external field, However, these particles tend to be only white, thereby providing only a limited color gamut to the display. Encapsulation of particles in a metal oxide shell, however, provides the electrical mobility properties of the metal oxide while retaining the optical or colorant functionality of the underlying particles encapsulated therein.

Most preferably in this embodiment, emulsion/aggregation particles are used to provide the structure for encapsulation with the metal oxide shell.

Metal alkoxide reagents are common precursor materials for the production of metal oxides. Metal alkoxides are readily hydrolyzed to provide a metal hydroxy intermediate, which then typically undergoes a condensation reaction to ultimately yield a metal oxide. This provides for what is termed a sol-gel metal oxide.

For example, in the case of titania from titanium isopropoxide (TIOP), the chemistry proceeds as (1) hydrolysis: $Ti(OCH(CH_3)_2)_4 + 4H_2O \rightarrow Ti(OH)_4 + 4HOCH(CH_3)_2$ and (2) condensation: $Ti(OH)_4 \rightarrow TiO_2 + 2H_2O$. The participation of water in step (1) provides for a templating driving force for the subsequent structure of the titania. In particular, the presence of water enables an interface to be formed when dispersed in a hydrocarbon so that the hydrolysis reaction can be made to proceed at the interface thereof, and once hydrolysis has proceeded, the titanium hydroxide intermediate species remains in the interfacial region owing to its sparing solubility in the hydrocarbon continuous phase. The formation of the titania shell thus proceeds at the interface.

In a preferred aspect of this embodiment, polyester emulsion/aggregation particles having sulfono groups in the polymer backbone (present as the result of sulfonation) or other hygroscopic groups is used as the templating agent for the hydrolysis and condensation reactions to form the metal oxide. Due to the presence of the sulfono groups, the particles are hygroscopic and therefore form domains of water when dispersed in a hydrocarbon solvent such as, for example, n-hexane. The metal oxide shell is thus formed at the interface of the particles and the hydrocarbon, forming an encapsulating metal oxide shell around the particles.

Other metal oxides may also be used to encapsulate the particles, including, for example, silica. Silica may be formed in a hydrolysis/condensation scheme similar to that of titania starting from, for example, tetraethoxysilane (TEOS).

While emulsion/aggregation particles are illustrated, any colored particles that are able to form domains of water within a hydrocarbon solvent may also be used. In particular, in another aspect of this embodiment, the metal oxide precursor may be hydrolyzed in a reverse micelle solution, the solution containing, for example, the hydrocarbon solvent such as octane as the continuous phase and water droplets dispersed therein with the aid of a surfactant. The hydrolysis of the metal oxide precursor (e.g., a metal alkoxide such as TEOS, TIOP, etc.) proceeds at the hydrocarbon/water interface, thereby providing a template for formation of the metal oxide. Thus, any material, such as an ink, water soluble polymer, etc., that is soluble in the aqueous core of the reverse micelle solution would be encapsulated by the metal oxide.

As an example material, sodium dioctyl'sulfosuccinate (AOT) is a twin tailed hydrocarbon surfactant that readily forms reverse micelles in a hydrocarbon solution. Reverse micelles are stabilized domains of water, or any hydrophilic material, immersed in a hydrocarbon continuous phase. These stable spherical domains subsequently template the hydrolysis and polymerization of a metal oxide precursor.

The overall encapsulated particle size and size distribution is preferably the same as discussed above with respect to emulsion/aggregation particles. The thickness of the encapsulating metal oxide shell is preferably on the order of submicrons to a few microns at most.

The advantages to metal oxide encapsulation include permitting the creation of particles of controlled size and size distribution possessing electrokinetic mobility. Also, such encapsulation permits great flexibility in the selection of electrically, magnetically and/or optically active materials within the particles to be encapsulated, the emulsion/aggregation process being particularly friendly to the incorporation of such materials into the particles.

Still further, metal oxides, particularly titania, are readily surface modified, and thus the charging properties of the encapsulated particles could be readily manipulated through surface treatment with appropriate charge controlling additives as discussed above, including for example silylating reagents such as octyltriethoxysilane or octadecyltrichlorosilane, and fluorinated silanes.

In the particular case of using reverse micelles, the advantages also include control over particle size via control of the size of the reverse micelle. The thermodynamic behavior of these micelles is well established and control of the particle size is easily manipulated by controlling the salinity of the water, the ration of the reverse micelle (e.g., AOT) to water and the temperature. Octane is a preferred hydrocarbon solvent due to its ability to solvate large quantities of water with the aid of AOT. This high penchant for water uptake enable a broad range of resultant particle sizes of the metal oxide sphere as the amount of water in the system determines the size of the micelle and, consequently, the size of the metal oxide spheres.

In another embodiment, if any of the above types of particles are selected as a first set of particles for use in the display liquid, charged carrier particles may be selected as a second set of particles to be included in the display fluid along with the first set of particles.

The examples of carrier particles that may be used are not limited, but mention may be made of iron oxide and other metal oxides, with or without surface coating to enhance the charge capability, as particularly suitable examples. The carrier may also be a synthetic carrier such as porous ferrite with polymer inside, extruded polymer with magnetic powder, E/A polymer particles with magnetic powder, or commercially available resinous magnetic powder. The size of the carrier is preferably from about the size of the particles to about 20 microns.

The advantages of using carrier particles as the second set of particles are many, and include that use of conventional carrier materials eliminates the need for inclusion of a second set of particles.

In a still further preferred embodiment of the invention, any of the above-described particle materials, which are non-magnetic in nature, may be used in conjunction with magnetic particles, e.g., magnetic colored or toner particles. The idea is to prepare a liquid containing two types of colored particles (one magnetic and one non-magnetic) with opposite charge and visual contrast color. Most preferably, the magnetic particles are dark-colored, e.g., black.

Figure 4:
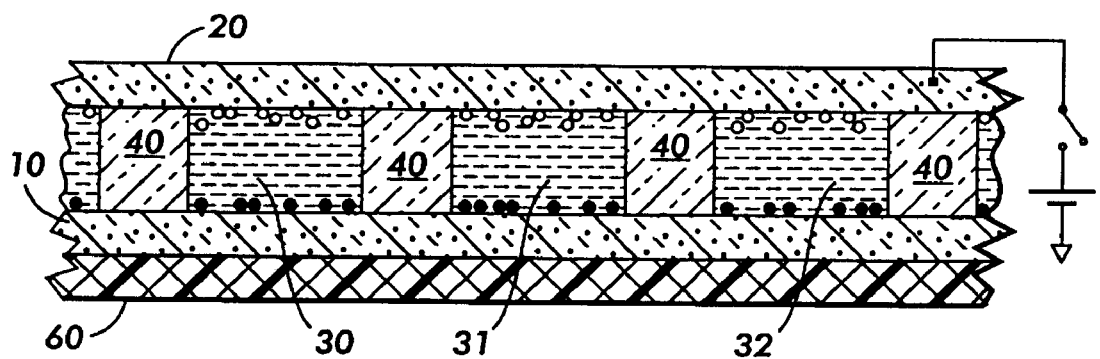
Figure 5:
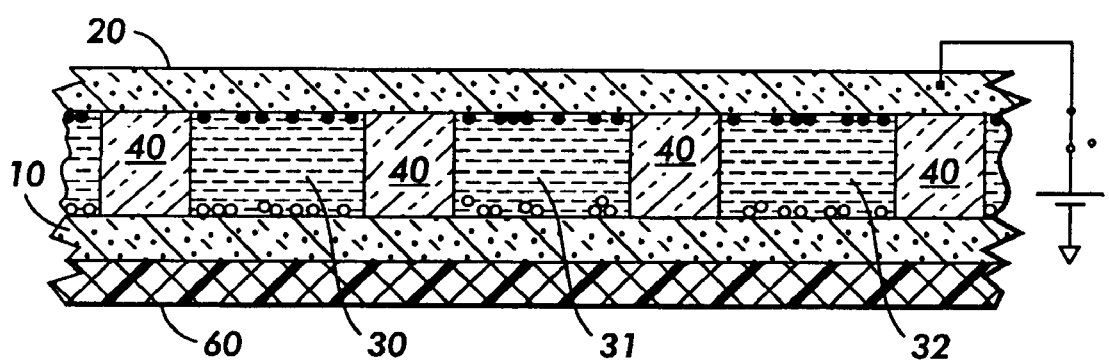
FIG. 5 illustrates the same electrophoretic display device in an on position.

FIG. 4 (off position) and FIG. 5 (on position) illustrate a side view of an example electrophoretic display device in which the display fluids include magnetic force attracting magnetic particles. As shown, the device is similar to the device of FIGS. 1 and 2, but includes an additional layer of a magnetic material, for example a magnetic plastic film 60, under the display to generate a magnetic force.

Application of a magnetic force can help attract the black magnetic particles to the bottom surface when the electric field it is at off position, which provides better powder for the white particles of the display fluid. Examples of magnetic particles include, but are not limited to, SCD (Single-Component Development) colored particles such as used in a DC265 digital printer, DC214 digital copier, and 1025 copier; or TCD (Two-Component Development) colored particles such as used in a DocuTech 5090 or 4635 MICR (Magnetic Ink Character Reader) printer.

In this embodiment, the switching thus involves not only application of the electric field, but also application of a magnetic force that works in conjunction with the electric field in moving the desired set of particles in the desired direction in the reservoir. The magnetic force applied to the black magnetic particles ranges from about 50 Gauss to about 600 Gauss. The magnetic force may be applied using a thin magnetic sheet with a thickness of from about 0.1 mm to about 4 mm and is composed of magnetic powder such as ferrite particles and thermoplastic resin such as silicon rubber. As the electrical field exceeds the magnetic force, the black magnetic particles move with the electrical field. As the electrical field is below the magnetic force the black magnetic particles move back. The magnetic force provides several advantages. It reduces the electrical field for black particles to move back towards the magnetic sheet and thus saves power. The magnetic sheet also helps hold the magnetic particles in the-reservoir.

In operating the electrophoretic display device, an electric field, which may either be AC or DC, but is preferably AC, is applied to the reservoirs of the device in order to move the desired set of particles in the reservoirs to be displayed. The particles in the reservoirs are preferably developed under an electrical field of from about 0.1 to about 1 volt per micron gap. For example, as described above with respect to FIGS. 1 and 2 (where a first set of white particles are not charged and a second set of black particles are charged), since white particles are not charged in the liquid system, they will not move under electrical field, whereas the colored particles are moving under the field. FIG. 1 shows that when no electrical field is applied, i.e., the field is in the off position, the colored (black) particles are scattered inside the reservoirs and therefore the color seen from the top surface is white. FIG. 2 shows that when the electrical field is applied, i.e., the on position, the colored (black) particles move to the top surface, and thus the color image appears. If the sets of particles have opposite charges, the off position could mean application of a negative electric field, and thus display of the white particles, while the on position could be application of a positive electrical field, and thus display of the black particles. The particles in these embodiments are moved within the liquid system by way of electrostatic force generated due to the electric field applied or not applied.

In the display device, each of the individual reservoirs is preferably individually addressable, although such is not necessary. Thus, the size of the electrodes can be the same as the size of the containers, enabling individual control of each container. In this manner, the electric field of each reservoir can be individually controlled. Also, the size of the electrodes can be different from the size of the containers, thereby enabling more than one container to be controlled by a single electrode where the electrode is larger than the container or enabling only a portion of the container to be controlled (turned on and off) by an electrode where the electrode is smaller than the size of a container. That is, the pattern of the electrodes does not need to line up with the reservoirs. The foregoing can be done by, for example, appropriate patterning of the conductive path on the bottom conductive film substrate. An example of the patterning of electrodes can be found in, for example, U.S. Pat. No. 3,668,106.

In another embodiment of the invention, the invention pertains to the intermittent application of an electric field to the reservoirs in order to disturb the particles therein in order to prevent agglomeration of the particles over time and to break-up any agglomerations that may have formed over periods of rest of the reservoir of the display device. As the particles age over a certain period of time, the particles tend to form soft agglomerates within the display fluid, thereby reducing particle mobility and causing the display quality to deteriorate. Also, when the reservoir has rested for a long period of time, the particles therein have a tendency to settle down at the bottom of the reservoir. To combat this, it has been found that an AC field may be occasionally applied in order to shake up the particle soft agglomerate or the sedimentation of the particles. Since each individual reservoir may be controlled electrically, this method can be easily applied, and is more reliable than application of mechanical disturbing forces that are traditionally used to re-disperse the particles.

As the application of the electric field here is for maintenance of the device, the application need only be made infrequently, for example on the order of about every 6 to 48 hours. The application may be limited to only those reservoirs that have been without activity for such periods of time, if desired. The application preferably consists of an electric field of about 0.1 to about 10 Hz for a period of from about 0.1 sec. to about 10 secs.

The switching frequency depends on the switching time required for an image to change from one color to another and the switching time is calculated as the distance that particles have to travel divided by the particle mobility. For example, the typical switching time is about 1 second as the distance is about 250 microns and the particle mobility is about 1 micron/second/volt and the electrical field is 250 volts. The typical maximum switching frequency is 1 Hz in this case. The AC agitation field is from about 0.5 volt/micron to about 5 volt/micron. The AC agitation frequency is from about 0.5 times to about 20 times of the maximum switching frequency. The duration of AC agitation is from about 0.5 second to about 1 minute. The cycles of AC agitation are from about 1 cycle to about 10 cycles. The frequency of applying AC agitation to the display ranges from about 4 times per day to about 1 time every other day. The AC agitation provides a mechanism to shake the temporary particle agglomerate under the electrical field, to separate the particles apart, and to prolong the display lifetime.

Although the invention has been described with reference to specific preferred embodiments, it is not intended to be limited solely thereto. Rather, those having ordinary skill in the art will recognize that variations and modifications may be made therein which are within the spirit of the invention and within the scope of the claims.

What is claimed is:

1. A method of displaying an image with an electrophoretic display device, the electrophoretic display device comprising a multiplicity of individual reservoirs, each containing an electrophoretic display fluid, located between two conductive film substrates, at least one of which is transparent, and wherein the electrophoretic display fluid comprises at least a first set of particles and a second set of particles each dispersed in a transparent liquid system, the first set of particles exhibiting a color different from and contrasting to a color of second set of particles, and wherein the first set of particles are magnetic particles while the second set of particles are non-magnetic particles, the method comprising appropriately applying an electric field and a magnetic force to a selected individual reservoir in a manner to cause either the first set of particles or the second set of particles to be displayed.

2. The method according to claim 1, wherein the first set of particles exhibit a dark color while the second set of particles exhibit a light color.

3. The method according to claim 2, wherein the second set of particles are not charged or are charged oppositely to the first set of particles.

4. The method according to claim 3, wherein when the electric field is off, the magnetic force is on to attract the first set of magnetic particles to a bottom of the individual reservoir, thereby resulting in the second set of particles being displayed.

5. The method according to claim 3, wherein when the electric field is on to attract the first set of particles to a top of the individual reservoir, the magnetic force is off, thereby resulting in the first set of particles being displayed.

6. An electrophoretic display device comprising a multiplicity of individual reservoirs, each containing an electrophoretic display fluid, located between two conductive film substrates, at least one of which is transparent, wherein the electrophoretic display fluid comprises at least a first set of particles and a second set of particles each dispersed in a transparent liquid system, the first set of particles exhibiting a color different from and contrasting to a color of second set of particles, and wherein the first set of particles are magnetic particles while the second set of particles are non-magnetic particles, the electrophoretic display device further including an electric field application apparatus and a magnetic force application apparatus, both the electric field application apparatus and a magnetic force application apparatus being capable of being applied to the multiplicity of individual reservoirs separately.

7. The electrophoretic display device according to claim 6, wherein the electric field application apparatus comprises patterning of a conductive path on a surface of one or both of the conductive film substrates.

8. A method of maintaining an operation of an electrophoretic display device, the electrophoretic display device comprising a multiplicity of individual reservoirs, each containing an electrophoretic display fluid, located between two conductive film substrates, at least one of which is transparent, and wherein the electrophoretic display fluid comprises at least a first set of particles and a second set of particles each dispersed in a transparent liquid system, the first set of particles exhibiting a color different from and contrasting to a color of second set of particles and also exhibiting a different charging property from the second set of particles, the method comprising applying an electric field to an individual reservoir at risk of having particle agglomerations form therein for a period of time sufficient to prevent the formation of particle agglomerations and to break-up any particle agglomerations that may have formed.

9. The method according to claim 8, wherein the electric field is applied to the individual reservoir at an interval of between about every 6 hours and about every 48 hours.

10. The method according to claim 8, wherein the electric field comprises about 0.1 Hz to about 10 Hz and is applied for a period of from about 0.1 seconds to about 10 seconds.

11. The method according to claim 8, wherein the individual reservoir at risk is an individual reservoir that has been without activity for a period of about 6 to about 48 hours.

12. A method of maintaining an operation of an electrophoretic display device, the electrophoretic display device comprising a multiplicity of individual reservoirs, each containing an electrophoretic display fluid, located between two conductive film substrates, at least one of which is transparent, and wherein the electrophoretic display fluid comprises a set of particles dispersed in a colored liquid system, the particles exhibiting a color different from and contrasting to a color of the colored liquid, the method comprising applying an electric field to an individual reservoir at risk of having particle agglomerations form therein for a period of time sufficient to prevent the formation of particle agglomerations and to break-up any particle agglomerations that may have formed.

* * * * *